United States Patent [19]

Kiesow

[11] Patent Number: 5,929,903
[45] Date of Patent: Jul. 27, 1999

[54] MULTI-POSITION LENS MECHANISM FOR A SCANNER

[75] Inventor: Ronald H. Kiesow, Spencerport, N.Y.

[73] Assignee: Eastman Kodak Company, Rochester, N.Y.

[21] Appl. No.: 08/805,600

[22] Filed: Feb. 26, 1997

[51] Int. Cl.⁶ ....................................................... H04N 3/02
[52] U.S. Cl. ................................. 348/97; 348/98; 396/24
[58] Field of Search .................................. 348/96, 97–98, 348/100, 210, 376, 99, 552, 107, 76, 95; 358/59; 396/437, 24, 429, 310, 311; H04N 3/02

[56] References Cited

U.S. PATENT DOCUMENTS

| | | | |
|---|---|---|---|
| 3,881,053 | 4/1975 | Lemelson | 348/107 |
| 4,581,761 | 4/1986 | Ichinokawa et al. | 382/313 |
| 4,901,364 | 2/1990 | Faukelson et al. | 348/552 |
| 4,933,754 | 6/1990 | Reed et al. | 358/76 |
| 5,301,244 | 4/1994 | Parulski | 358/59 |
| 5,394,342 | 2/1995 | Poon | 348/95 |
| 5,402,170 | 3/1995 | Parulski et al. | 348/376 |
| 5,437,210 | 8/1995 | Fraser et al. | 74/567 |
| 5,644,356 | 7/1997 | Swinson et al. | 348/96 |
| 5,732,297 | 3/1998 | Tanaka et al. | 396/311 |

*Primary Examiner*—Tommy P. Chin
*Assistant Examiner*—Gims S. Philippe
*Attorney, Agent, or Firm*—Peyton C. Watkins

[57] ABSTRACT

A scanner mechanism having a multi-position lens assembly for capturing images resident on an original includes an electronic camera for capturing the images and providing an image signal therefrom and a base assembly having a camera housing which supports the camera for movement relative to an optical axis in order to define plural fields of view. A lifting cam is mounted for pivotal movement from the base assembly, pivoting at one end thereof in spaced relation to the camera and engaging the camera at the other thereof for movement relative to the base assembly to define the plural fields of view, the lifting cam further having a contour cam surface on one side thereof. A slide is movable in relation to the base assembly and supports at least two lens assemblies in spaced relation relative to the optical axis of the camera. Since the slide has a surface element movable therewith for engaging the contour cam surface of the lifting cam, the slide is moved until the lifting cam positions the camera relative to a selected lens assembly in the optical axis of the camera.

9 Claims, 4 Drawing Sheets

MULTI-POSITION LENS MECHANISM FOR A SCANNER

CROSS-REFERENCE TO RELATED APPLICATION(S)

Reference is made to commonly assigned copending U.S. application Ser. No. 08/713,057, entitled "Film Handling and Illuminating Mechanism for Tethered Electronic Camera" and filed on Sep. 12, 1996 in the names of John R. Fredlund, Joseph A. Manico, Kenneth A. Parulski, which is assigned to the assignee of this application.

FIELD OF THE INVENTION

The invention relates to the field of electronic imaging, and in particular to an electronic scanner for capturing images that are resident on film and inputting the captured images to a computer.

BACKGROUND OF THE INVENTION

Typically, electronic cameras and scanners have been expensive. The need to provide full portability in an electronic camera system drives up cost and complexity. In a typical approach for a computer hookup, as shown in U.S. Pat. No. 4,933,754, a full featured video camera is coupled to a personal computer through a framegrabber circuit board accessory to capture slide images. In a system where an electronic still camera is designed to be directly tethered to the computer, the need for many expensive components is eliminated, and complexity is reduced. For example, U.S. Pat. No. 5,402,170 describes a low cost electronic still camera tethered to a personal computer which provides image processing, storage, and display of the captured images. By relying on the computer to perform these tasks, the camera cost can be greatly reduced.

Stand-alone film scanners likewise are expensive and complex. They are also usually dedicated to a single purpose, and represent a high cost to the average consumer. For example, a color sequential scanner shown in U.S. Pat. No. 5,301,244 uses a computer to perform certain functions, such as color correction, but nonetheless represents a complex, specialized piece of equipment. This high cost for a single purpose device has minimized the utility of conventional photographic film as an image input for desktop computer systems.

When it is necessary to provide more than one magnification option in a scanner, a means of translating lenses to different positions accurately is required. If a large variation in focal lengths in the lenses exists, and it is desirable to keep the linear motion of the lenses to a minimum, a simple pivoting or circular cam mechanism is not feasible. This is due to the severe angles that occur along the faces of the cam(s) when trying to move the lenses in the shortest possible distance or with a compact rotary mechanism (usually referred to as locking angles). Space constraints also contribute to the allowable size of any chosen mechanism.

It would be desirable to merge the benefits of a relatively simple film scanning platform with efficient lens translation in order to capture images resident on a film in a simple and inexpensive manner.

SUMMARY OF THE INVENTION

The present invention is directed to overcoming one or more of the problems set forth above. Briefly summarized, according to one aspect of the present invention, a scanner mechanism having a multi-position lens assembly for capturing images resident on an original includes an electronic camera for capturing the images and providing an image signal therefrom and a base assembly having a camera housing which supports the camera for movement relative to an optical axis in order to define plural fields of view. A lifting cam is mounted for pivotal movement from the base assembly, pivoting at one end thereof in spaced relation to the camera and engaging the camera at the other thereof for movement relative to the base assembly to define the plural fields of view, the lifting cam further having a contour cam surface on one side thereof. A slide is movable in relation to the base assembly and supports at least two lens assemblies in spaced relation relative to the optical axis of the camera. Since the slide has a surface element movable therewith for engaging the contour cam surface of the lifting cam, the slide is moved until the lifting cam positions the camera relative to a selected lens assembly in the optical axis of the camera.

This design provides a technically advantageous means for accurately translating lenses containing large focal length variations in a reasonable linear distance. This allows the use of "off the shelf" lenses, which may not require any tooling or development costs.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing film or electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts.

Figure 1:
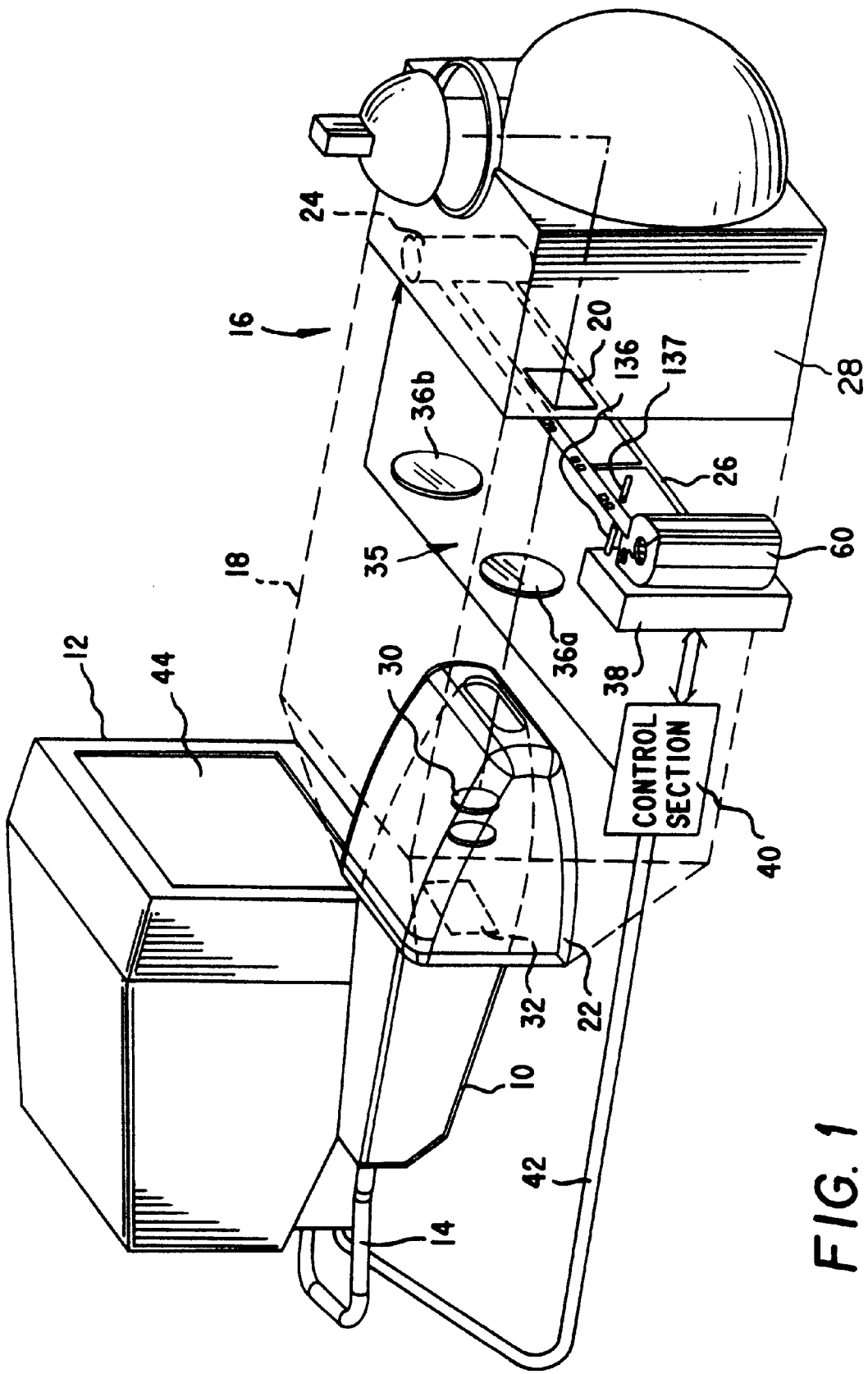
FIG. 1 is a diagram of an electronic photography system including a tethered electronic camera used with a film handling and illumination mechanism as described in copending Ser. No. 08/713,057.

In copending U.S. Ser. No. 08/713,057, a film handling mechanism is used with a digital camera in order to capture images on a film and transmit the captured images to a computer. The film handling mechanism includes, as shown generally in FIG. 1, a digital camera 10 tethered to a computer 12 by a cable 14, and a film handling and illumination attachment 16 that mates with the digital camera 10. The film handling and illumination attachment 16 includes a housing 18 having a film gate 20, a nest 22 for the camera 10, a film transport mechanism 24 for transporting a film 26, and a film illuminator 28. The nest 22 supports the digital camera 10 in a position that allows the camera 10 to image the film gate 20 through its internal optics 30 upon an image sensor 32 in the camera.

By configuring the housing to allow removal of the camera from the film handling mechanism, the user obtains a system which has the utility of normal camera input along with the ability to image film with the same camera. The camera 10 also includes conventional signal processing and an interface for communicating an image signal obtained from the image sensor 32 through the cable 14 to the computer 12. The camera 10 is preferably connected to the host computer 12 via a USB (universal serial bus) digital host interface, which also provides power to the camera 10. USB is a well-known shared bus that can be connected to other devices, such as keyboards, printers, etc. (USB is described in the *Universal Serial Bus Specification*, 1.0 Final Draft Revision, Nov. 13, 1995, which can also be viewed on the Web at http://www.teleport.com/-USB.)

The film transport mechanism 24 supports the film 26 for passage through the film gate 20 within a field of view of the camera 10, and the illuminator 28 illuminates the film 26 in the film gate 20. The film handling and illumination attachment 16 also includes an optical section 35 which allows a camera designed for standard office environment viewing distances to change its field of view to that of the image area of the film. In particular, according to copending U.S. Ser. No. 08/713,057, the different fields of view are accommodated by different lenses 36a and 36b. A movable slide (as shown in FIGS. 4A, 4B, and 7 in copending U.S. Ser. No. 08/713,057) supports the two lenses 36a and 36b in spaced relation relative to the field of view of the camera 10, and a camming arrangement anchored to the slide moves the camera 10 as the slide moves one of the lenses into the field of view of the camera.

The attachment 16 also includes a sensor block 38 for sensing indicia, e.g., perforations, on the film 26. If the film has a magnetic recording region, the sensor block 38 further includes a magnetic head for sensing the recording region. In addition, the sensor block 38 senses bar code, such as conventionally found on 35 mm film or as a DX code on the 35 mm cassette, and alphanumeric characters. The film handling and illumination attachment 16 may either be set up for a particular film size, e.g., 35 mm film, or for a variety of film sizes by, e.g., adjustment of the optical section 35 for different fields of view. The film transport mechanism 24 and the sensor block 38 are connected to a control section 40, which interfaces through a cable 42 with the computer 12 for purposes of controlling the advance of the film 26. The image data from the camera 10 is processed by the host computer 12 to create final images that can be displayed on a computer monitor 44.

Figure 2A:
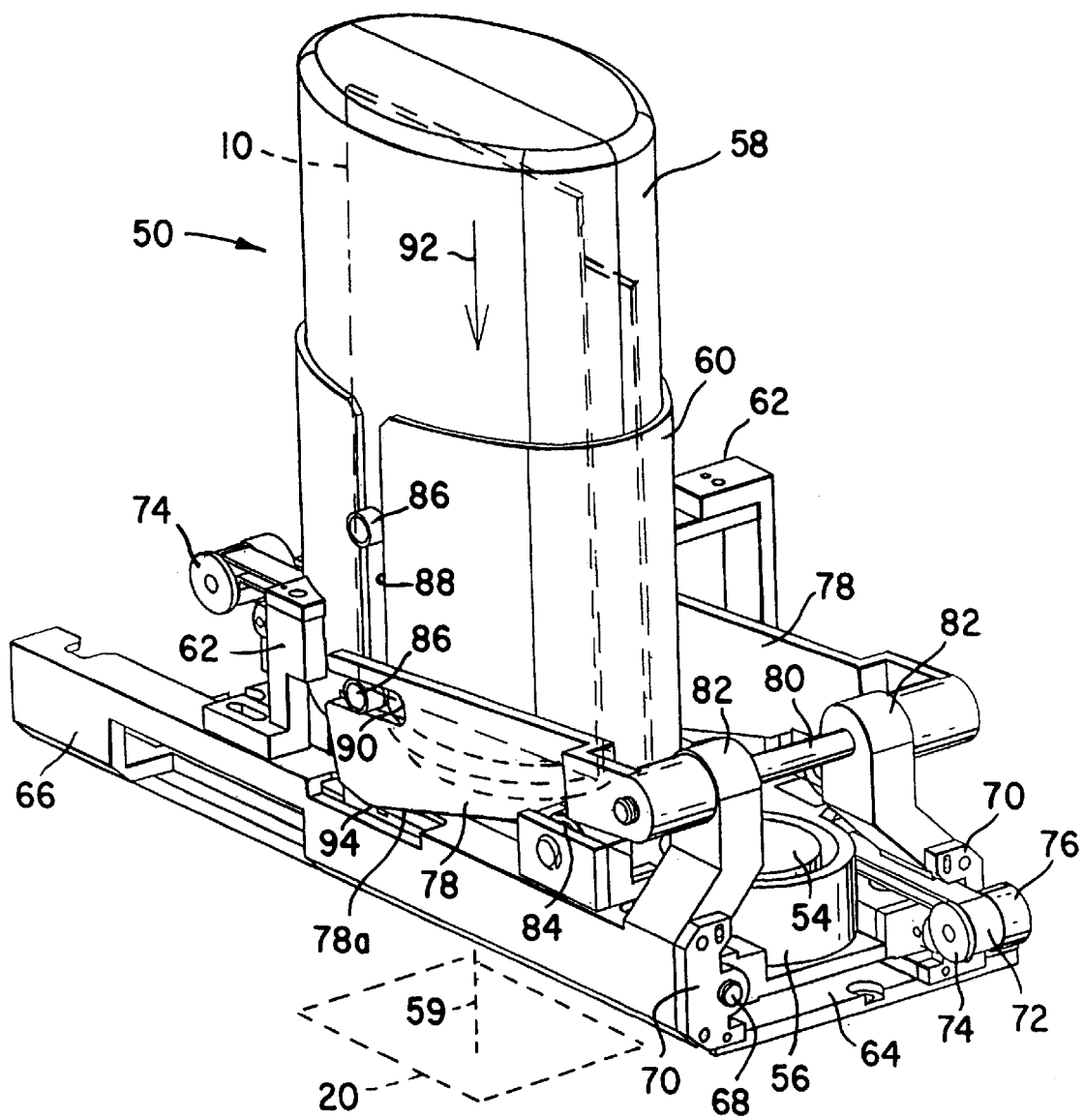
FIGS. 2A and 2B show a film scanner having a multi-position lens mechanism according to the invention providing both a conventional scan position and a zoom scanning position.
Figure 2B:
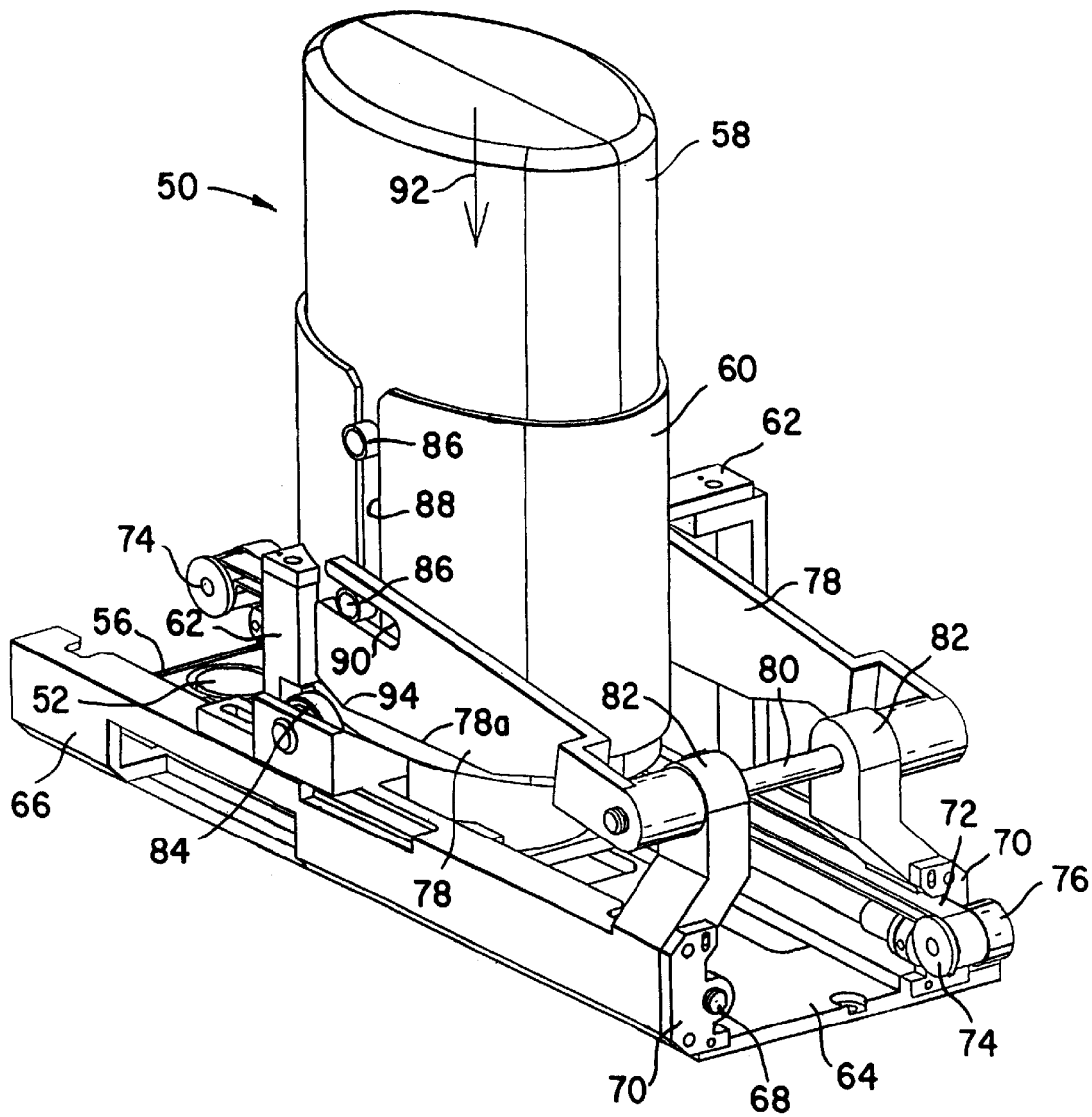
Figure 3:
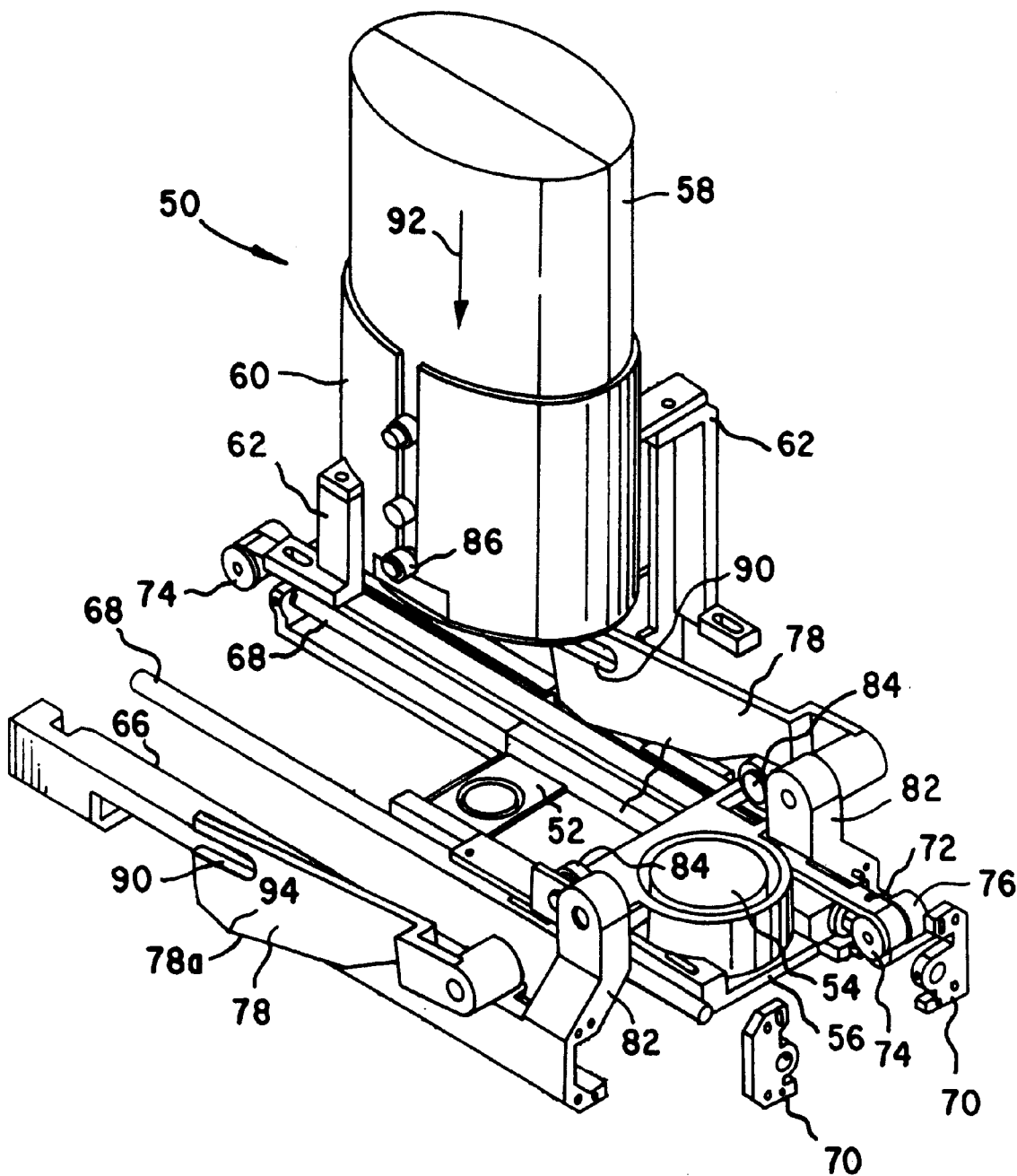
FIG. 3 is an exploded view of the film scanner shown in FIGS. 2A and 2B.

FIGS. 2A, 2B, and 3 show several views of a film handling and illumination attachment especially designed with a multi-position lens mechanism according to the invention. Referring first to FIGS. 2A and 2B, the attachment is shown in a conventional scan position (FIG. 2A) for imaging substantially the whole frame, and a zoom scanning position (FIG. 2B) for imaging a smaller area of the frame. (It is also helpful to refer to the exploded view in FIG. 3 in the course of the following description). The attachment includes: a tower 50 for supporting the digital camera 10 in the nest 22 (see FIG. 1) for movement between the two positions shown in FIGS. 2A and 2B; two optical sections represented by a standard lens 52 for the conventional scan position and a zoom lens 54 for the zoom scanning position both supported on a slide 56. The camera is supported in an optical axis 59 relative to the film gate 20 of the film handling and illumination attachment (see FIG. 2A).

The tower 50 includes a movable camera housing 58 for supporting the camera 10 and a stationary guide 60 in which the housing 58 moves. The stationary guide 60 is attached by brackets 62 to a mechanical plate assembly 64, which serves as the basic support for the attachment. The mechanical plate assembly 64 is provided with sidewalls 66 which provide a bed for supporting the slide 56 for movement between its two positions. The slide 56 is further supported for movement along the guide rails 68, which are attached to the mechanical plate assembly 64 with brackets 70. A timing belt 72 is attached to the slide 56 and two pulleys 74. Adjustment of a position knob 76 attached to one of the pulleys 74 moves the timing belt 72, and the slide 56 therewith, between the two scanning positions shown in FIGS. 2A and 2B.

Vertical movement of the movable camera housing 58 is provided by a cam assembly comprising two lifting cams 78 connected by a pivot 80 to two pivot brackets 82 on the mechanical plate assembly, and two surface elements, e.g., bearings 84, for causing rotational movement of the lifting cams 78 about the pivot 80. The movable camera housing 58 includes two rollers 86 on each side which slide within a slot 88 in the stationary guide 60, and the lifting cams 78 include a camming slot 90 which engages the lower one of the rollers 86. In this design, the lenses 52 and 54 are encased in the slide/lens housing 56. The lenses are required to move accurately between the two positions, that is, the "full frame" conventional format position shown in FIG. 2A and the "zoom" format position shown shown in FIG. 2B. More positions could be achieved by changing the cam profiles and increasing the linear travel if this was desired.

When required, a rotary motion (manual or electrically induced) is applied to the pulleys 74. This causes the timing belt 72 to be actuated, translating the slide 56 along the two guide rails 68. Along with the lenses 52 and 54, the slide 56 also contains the two roller bearings 84. When the slide 56 is actuated, the roller bearings 84 contact the face of the two lifting cams 78. The moving roller bearings force the cams to lift the camera housing 58 in a vertical direction (guided by the rollers 86 and the slots 88 in the stationary guide housing 60). The contour 78a of the faces on each cam 78 causes the camera housing 58 to be positioned vertically such that the lenses 52 and 54 may be translated to the proper position. The roller bearings 84 mounted on the slide 56 raise the lifting cams 78, and the movable camera housing 58 therewith, to an uppermost position defined by a cam high point 94. Further movement of the slide 56 causes the movable camera housing 58 to settle on a positioning land (not shown), which separates the bearing 84 from the lifting cams 78. This provides precise alignment of the camera optics with the zoom lens 54. When positioned, the proper location of the camera is maintained by the application of a force (spring, detent or gravity), this is represented by a downward arrow 92 on the attached drawings. The entire mechanism is mounted in a base assembly 64, which consists of the two rail/pivot brackets 66 and #24, and a pivot shaft 80.

In operation, the user chooses the scan position and moves the position knob 76 accordingly to position the correct lens 52 or 54 between the digital camera 10 and the film gate 20. Moving the knob 76 from the conventional scan position (FIG. 2A) to the zoom scanning position (FIG. 2B) indexes the timing belt 72 and moves the slide 56 therewith. With everything turned on and the film inserted, the control section 40, which is connected to the computer 12, increments the attachment 16 through its operational flow. The image is captured by the camera 10 and communicated by the USB cable 14 to the computer 12. Then the film is incremented to the next frame, captured, transmitted to the computer, and so on with the remaining frames.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | digital camera |
| 12 | computer |
| 14 | cable |
| 16 | film handling and illumination attachment |
| 18 | housing |
| 20 | film gate |
| 22 | nest |
| 24 | film transport mechanism |
| 26 | film |
| 28 | illuminator |
| 30 | camera optics |
| 32 | image sensor |
| 35 | optical section |
| 36a, 36b | lens |
| 38 | sensor block |
| 40 | control section |
| 42 | cable |
| 44 | computer monitor |
| 50 | tower |
| 52 | standard lens |
| 54 | zoom lens |
| 56 | slide |
| 58 | movable camera housing |
| 60 | stationary guide |
| 62 | brackets |
| 64 | mechanical plate assembly |
| 66 | side walls |
| 68 | guide rails |
| 70 | brackets |
| 72 | timing belt |
| 74 | pulleys |
| 76 | position knob |
| 78 | lifting cams |
| 80 | cam pivot |
| 82 | pivot brackets |
| 84 | bearing |
| 86 | rollers |
| 88 | slot |
| 90 | camming slot |
| 92 | force arrow |
| 94 | cam high point |

I claim:

1. A scanner mechanism having a multi-position lens assembly for capturing images resident on an original, said scanner mechanism comprising:

an electronic camera for capturing the images and providing an image signal therefrom;

a base assembly having a camera housing which supports the electronic camera for movement relative to an optical axis in order to define plural fields of view;

a lifting cam mounted for pivotal movement from the base assembly, said lifting cam pivoting at one end thereof in spaced relation to the camera and engaging the camera at the other end thereof for vertical movement of the camera housing relative to the base assembly to define the plural fields of view, said lifting cam further having a contour cam surface on one side thereof;

a slide movable in relation to the base assembly and supporting at least two lens assemblies, said at least two lens assemblies being movable with said slide and being in spaced relation relative to the optical axis of the camera, said slide having a surface element movable therewith for engaging the contour cam surface of the lifting cam; and means for moving the slide with the surface element of the slide engaging the contour cam surface of the lifting cam until the lifting cam positions the camera relative to a selected lens assembly in the optical axis of the camera.

2. The scanner mechanism as claimed in claim 1 wherein the housing includes means for detachably supporting the digital camera in the housing, whereby the digital camera may be removed from the housing.

3. The scanner mechanism as claimed in claim 1 wherein said at least two lens assemblies modify the field of view of the digital camera to correspond to a conventional view of the film image and to a zoomed view of the film image.

4. The scanner mechanism as claimed in claim 1 wherein the surface element on the lifting cam is a roller that engages the contour surface of the lifting cam.

5. The scanner mechanism as claimed in claim 1 wherein the lifting cam engages on side of the camera and the scanner mechanism further comprises a second lifting cam that engages the other side of the camera.

6. A film handling mechanism that captures developed images resident on a film and transmits the captured images to a computer, said film handling mechanism comprising:

an electronic camera for capturing the images and providing an image signal therefrom;

a base assembly having a camera housing which supports the camera for movement relative to an optical axis in order to define plural fields of view within a film gate;

a lifting cam mounted for pivotal movement from the base assembly, said lifting cam pivoting at one end thereof in spaced relation to the camera and engaging the camera at the other end thereof for vertical movement of the camera housing relative to the base assembly to define the plural fields of view, said lifting cam further having a contour cam surface on one side thereof;

a slide movable in relation to the base assembly and supporting at least two lens assemblies, said at least two lens assemblies being movable with said slide and being in spaced relation relative to the optical axis of the camera, said slide having a surface element movable therewith for engaging the contour cam surface of the lifting cam;

means for moving the slide with the surface element of the slide engaging the contour cam surface of the lifting cam until the lifting cam positions the camera relative to a selected lens assembly in the optical axis of the camera;

means for transporting the film through the film gate; and means for illuminating the film gate and the film therewith.

7. The film handling mechanism as claimed in claim 6 wherein the housing includes means for detachably supporting the digital camera in the housing, whereby the digital camera may be removed from the housing.

8. The film handling mechanism as claimed in claim 6 further comprising:

an interface for communicating with the computer; and means for sensing indica on the film and generating corresponding signals that are communicated to the computer through the interface.

9. The film handling mechanism as claimed in claim 6 wherein said at least two lens assemblies modify the field of view of the digital camera to correspond to a conventional view of the film image and to a zoomed view of the film image.

* * * * *